US 8,069,562 B2

(12) United States Patent
Couture et al.

(10) Patent No.: US 8,069,562 B2
(45) Date of Patent: Dec. 6, 2011

(54) METHOD OF MANUFACTURING A BRUSH SEAL FOR SEALING BETWEEN STATIONARY AND ROTARY COMPONENTS

(75) Inventors: Bernard Arthur Couture, Schenectady, NY (US); William Edward Adis, Scalia, NY (US)

(73) Assignee: General Electric Company, Schenectady, NY (US)

( * ) Notice: Subject to any disclaimer, the term of this patent is extended or adjusted under 35 U.S.C. 154(b) by 178 days.

(21) Appl. No.: 12/624,486

(22) Filed: Nov. 24, 2009

(65) Prior Publication Data

US 2010/0064499 A1 Mar. 18, 2010

Related U.S. Application Data

(62) Division of application No. 11/237,824, filed on Sep. 29, 2005, now Pat. No. 7,653,993.

(51) Int. Cl.
*B21D 53/84* (2006.01)
(52) U.S. Cl. .............................. 29/888.3; 29/464; 300/21
(58) Field of Classification Search ................. 29/888.3, 29/464; 300/21
See application file for complete search history.

(56) References Cited

U.S. PATENT DOCUMENTS

| | | | | |
|---|---|---|---|---|
| 2,449,668 A | * | 9/1948 | Peterson | 300/21 |
| 2,634,167 A | * | 4/1953 | Bible, Jr. | 300/21 |
| 3,689,117 A | * | 9/1972 | Hules | 300/21 |
| 4,024,004 A | * | 5/1977 | Metzler | 156/169 |
| 4,204,629 A | * | 5/1980 | Bridges | 228/160 |
| 4,302,494 A | * | 11/1981 | Horton | 428/95 |
| 5,318,309 A | | 6/1994 | Tseng et al. | |
| 5,474,306 A | | 12/1995 | Bagepalli et al. | |
| 5,799,952 A | | 9/1998 | Morrison et al. | |
| 5,961,279 A | | 10/1999 | Ingistov | |
| 6,027,121 A | | 2/2000 | Cromer et al. | |
| 6,226,975 B1 | | 5/2001 | Ingistov | |
| 6,286,211 B1 | | 9/2001 | Turnquist et al. | |
| 6,382,632 B1 | | 5/2002 | Chupp et al. | |

(Continued)

OTHER PUBLICATIONS

Adis et al., U.S. Appl. No. 11/237,976 entitled "Pressure Balanced Brush Seal", filed Sep. 29, 2005.

(Continued)

*Primary Examiner* — Richard Chang
(74) *Attorney, Agent, or Firm* — Nixon & Vanderhye, P.C.

(57) ABSTRACT

A method of manufacturing a brush seal includes the steps of maintaining a pair of first elongated frames spaced from one another on a fixture; wrapping wire strands about and longitudinally along the pair of frames in multiple longitudinal wire passes forming wire runs; disposing two pairs of first elongated plates between the wire runs at respective locations spaced from one another along the wire runs and at an angle to the wrapped strands with the plates of each of two pairs lying parallel to and in registration with one another; clamping two pairs of second elongated plates at second respective locations along an outside of the wire runs with each pair of the second plates registering with each pair of the first plates, the two pairs of second plates extending generally parallel to the pairs of the first plates; cutting the wrapped strands outside of and beyond the first and second pairs of plates forming two wire strand runs with both ends of each of the runs disposed between and straddled by the first and second pairs of plates; welding the cut strand runs and the pair of plates straddling the both ends of the runs; and cutting the wire strand runs intermediate the welded ends of the strand runs to form two bristle packs from each of runs and from which the bristle packs form the brush seals.

5 Claims, 8 Drawing Sheets

U.S. PATENT DOCUMENTS

| | | |
|---|---|---|
| 6,406,027 B1 | 6/2002 | Aksit et al. |
| 6,431,827 B1 | 8/2002 | Wolfe et al. |
| 6,460,857 B1 | 10/2002 | Turnquist et al. |
| 6,499,742 B1 | 12/2002 | Zhou et al. |
| 6,505,835 B2 | 1/2003 | Tong et al. |

OTHER PUBLICATIONS

Couture et al., U.S. Appl. No. 11/237,824 entitled "A Method of Manufacturing a Brush Seal for Sealing Between Stationary and Rotary Components", filed Sep. 29, 2005.

* cited by examiner

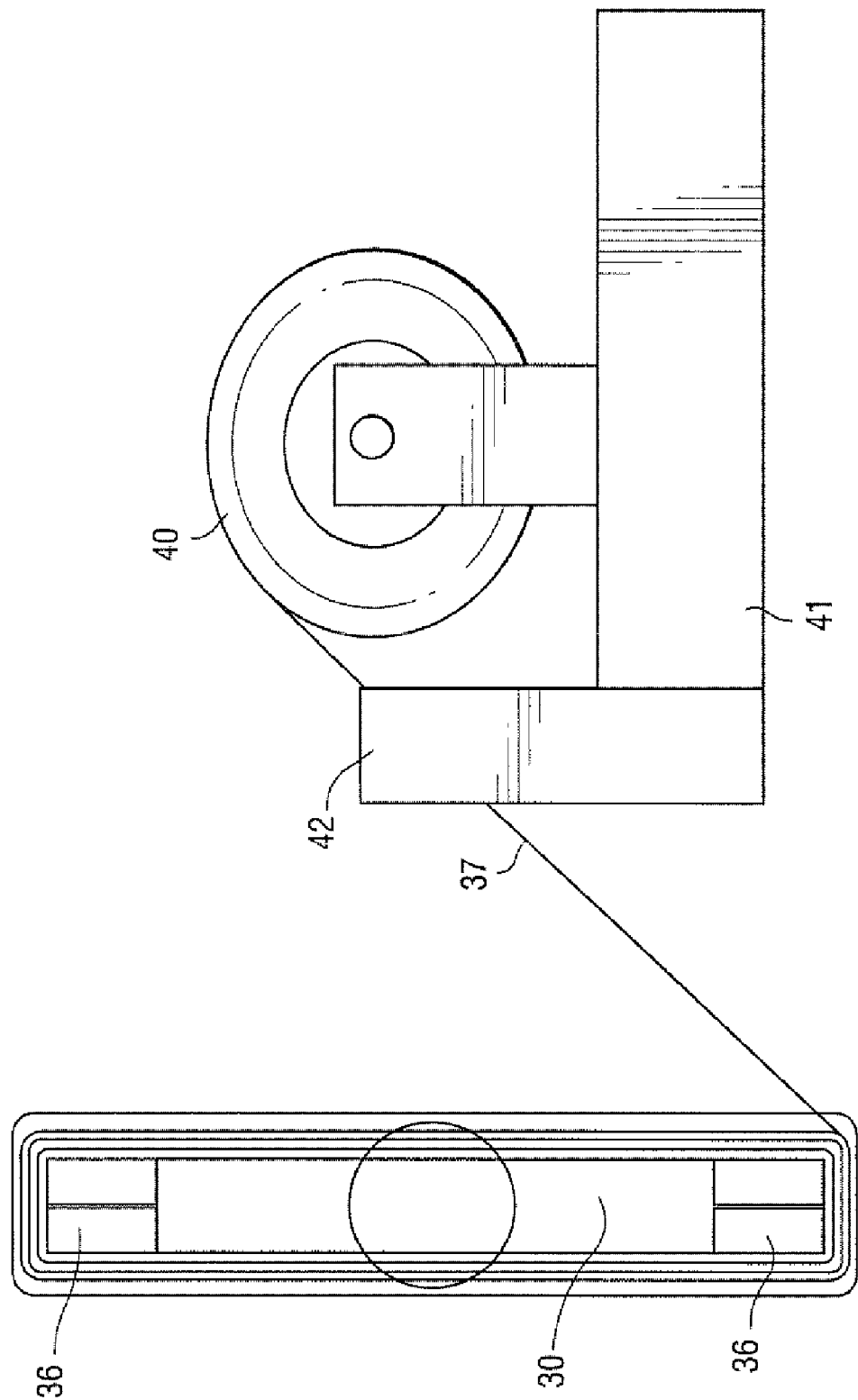

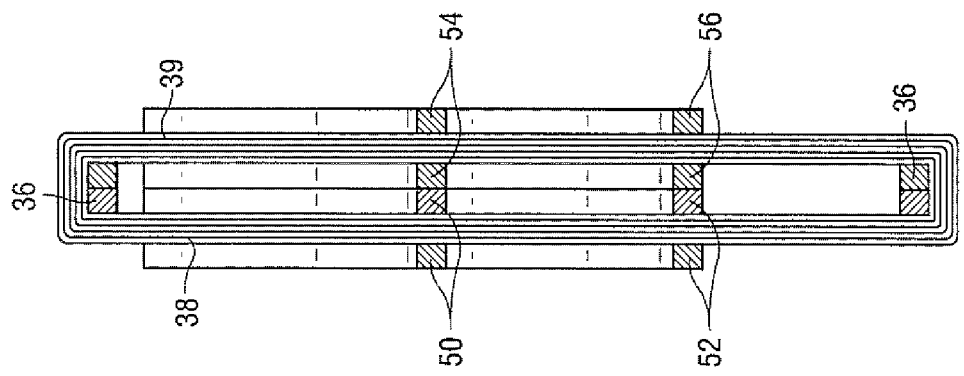
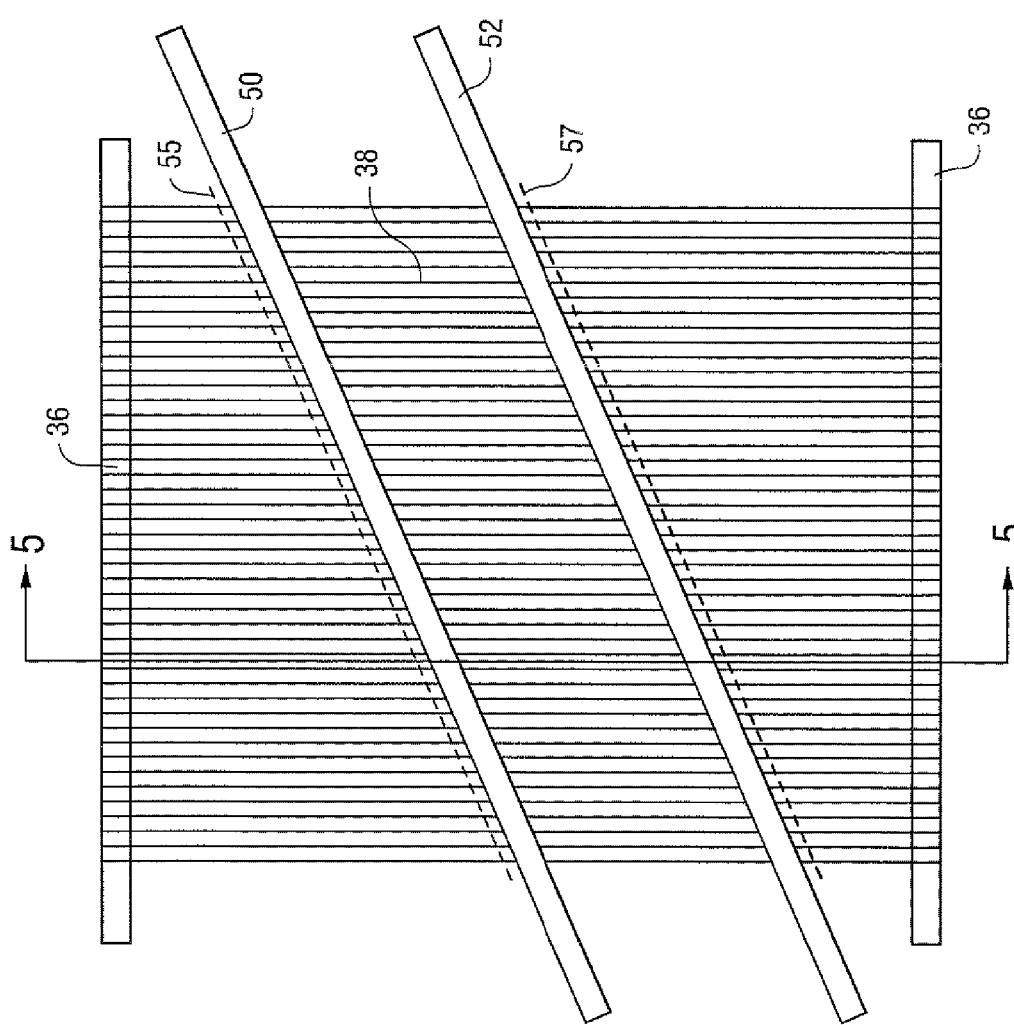

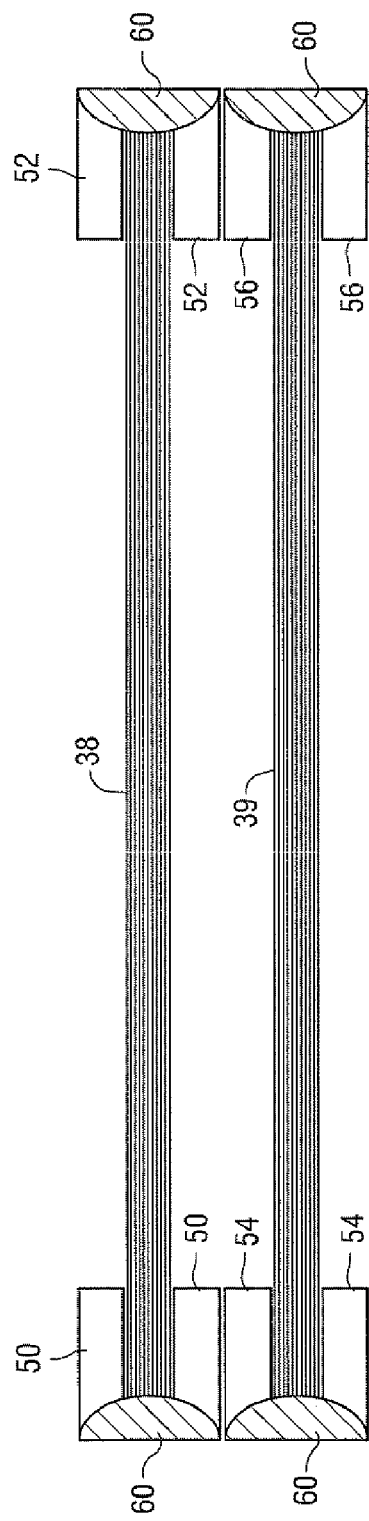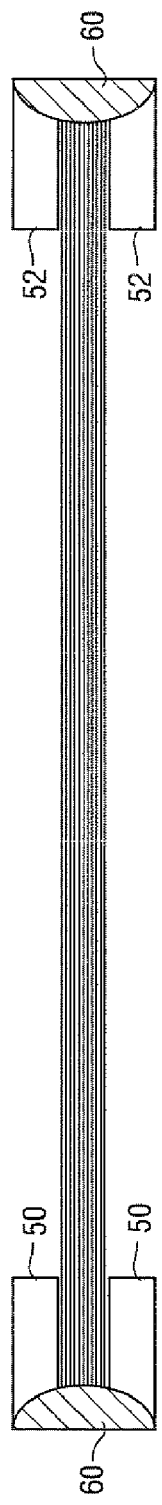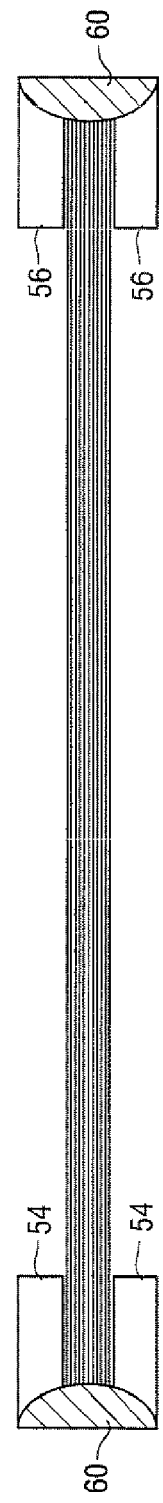
Fig. 8
Fig. 9

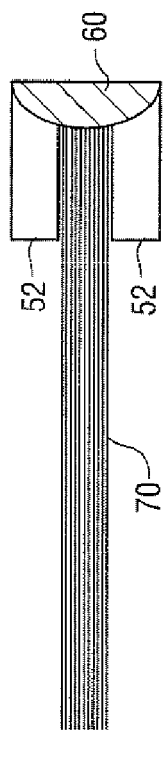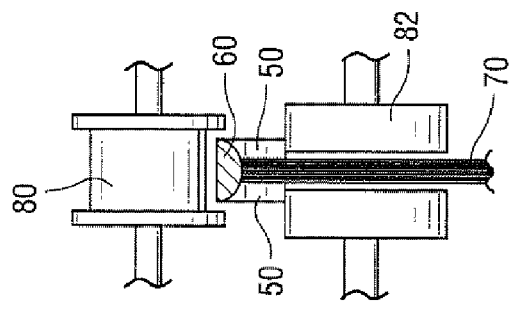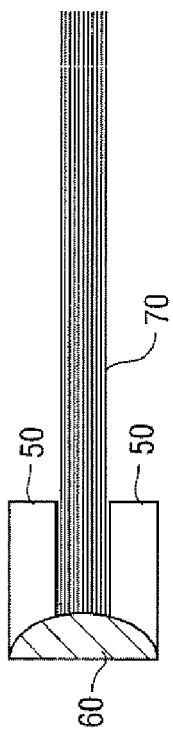

METHOD OF MANUFACTURING A BRUSH SEAL FOR SEALING BETWEEN STATIONARY AND ROTARY COMPONENTS

RELATED APPLICATION

This application is a divisional of U.S. application Ser. No. 11/237,824 filed on Sep. 29, 2005 now U.S. Pat. No. 7,653,993, the entirety of which is incorporated by reference.

BACKGROUND OF THE INVENTION

The present invention relates to a method of manufacturing a brush seal and particularly relates to a method of manufacturing a generic brush bristle pack which can be formed to required diameters, in segments, with enhanced efficiency, minimum cost, and reduced manufacturing time.

Brush seals are typically employed for sealing between stationary and rotary components, e.g. packing about a rotary shaft in a turbine, and between high and low pressure regions on opposite sides of the seal. Conventional bristle packs particularly in high temperature environments require precise placement of super alloy bristles while maintaining tight tolerances. It will be appreciated that particular angles and varying separation between the bristles is required and for different diameter applications. Current methods of manufacture essentially require manual orientation of the bristles on a machined fence. As will be appreciated, this is a time consuming and costly method of manufacture. Accordingly, there is a need for a method of manufacturing brush seals in which a lower cost generic brush seal bristle pack can be fabricated and rolled to a required radius of curvature with minor machining to fit the application.

SUMMARY OF A PREFERRED EMBODIMENT

In a preferred embodiment of the present invention there is provided a method of manufacturing a brush seal comprising the steps of (a) winding wire about a pair of frames spaced from one another to form first and second spaced runs of wire between the frames; (b) disposing first and second pairs of elongated elements at respective first and second locations spaced from one another along the first run with the elements of each pair thereof lying on opposite sides of the first run and in generally parallel registration with one another; (c) disposing first and second pairs of elongated elements at respective first and second locations spaced from one another along the second run with the elements of each pair thereof lying on opposite sides of the second run and in generally parallel registration with one another, the first and second pairs of elements along the first run lying generally parallel to and in registration with the first and second pairs of elements along the second run, respectively; (d) removing portions of each run outwardly beyond the spaced pairs of elements leaving remaining portions of each run extending between the spaced pairs thereof and end run portions between the elements of each pair thereof; (e) securing the elements of each pair thereof and the end run portions extending therebetween to one another; and (f) severing the remaining runs to form four bristle pack sections each having wires cantilevered from a pair of the elements and from which sections one or more brush seals are formed.

In a further preferred aspect of the present invention, there is provided a method of manufacturing a brush seal comprising the steps of: (a) maintaining a pair of first elongated frames spaced from one another on a fixture; (b) wrapping wire strands about and longitudinally along the pair of frames in multiple longitudinal wire passes forming wire runs; (c) disposing two pairs of first elongated plates between the wire runs at respective locations spaced from one another along the wire runs and at an angle to the wrapped strands with the plates of each pair lying parallel to and in registration with one another; (d) clamping two pairs of second elongated plates at respective locations along an outside of the wire runs with each pair of second plates registering with the respective first pairs of plates, the two pairs of second plates extending generally parallel to the pairs of the first plates; (e) cutting the wrapped strands outside of and beyond the first and second pairs of plates forming two wire strand runs with both ends of each run disposed between and straddled by a pair of plates; (f) welding the cut strands and the pair of plates straddling the cut ends to one another at respective opposite ends of each cut wire strand run; and (g) cutting each wire strand run intermediate the welded ends of each strand run to form two bristle packs from each run and from which bristle packs brush seals may be formed.

BRIEF DESCRIPTION OF THE DRAWINGS

FIG. 3 is a schematic side elevational view of the frame, wire reel and wire guide;

FIG. 4 is a plan view of wire runs with plates being inserted between the runs;

FIG. 5 is an end elevational view thereof;

FIG. 8 is a cross sectional view illustrating the pairs of frames and wire runs after the excess wire is removed;

FIG. 9 is a view similar to FIG. 8 with the runs separated;

FIG. 10 is an end view illustrating the run cut in half to form two brush seals;

FIG. 11 is a schematic illustration of forming the brush seal to a predetermined diameter;

FIG. 12 is a cross-sectional view thereof; and

DETAILED DESCRIPTION OF THE INVENTION

Figure 1:
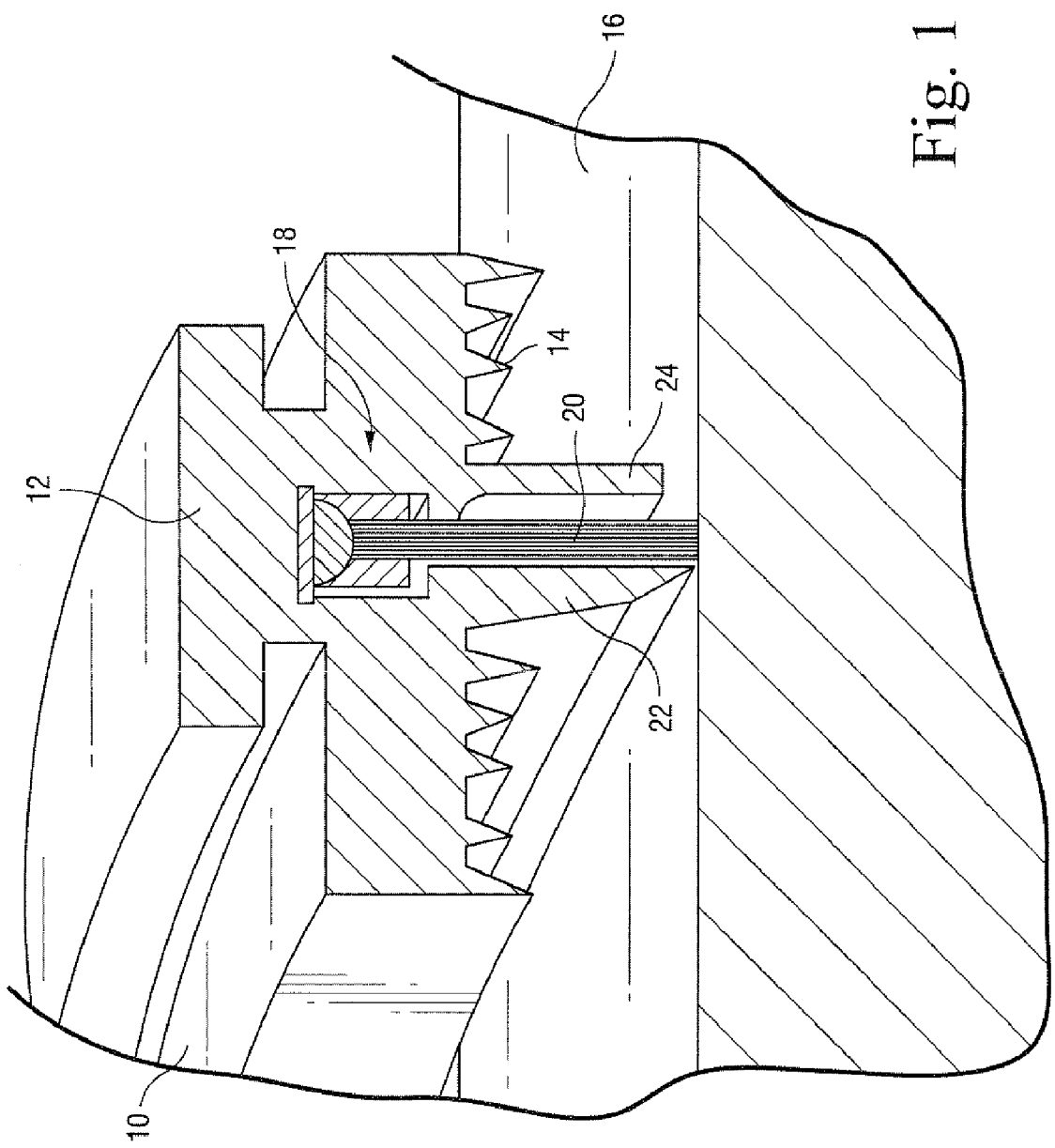
FIG. 1 is a fragmentary perspective view of a packing ring and shaft mounting a brush seal constructed in accordance with a preferred embodiment of the present invention.

Referring to FIG. 1 there is illustrated a packing ring 10 including a dovetail 12 on one side for securement to a stationary component and a plurality of labyrinth teeth 14 on the opposite side for sealing with a rotary component 16. As illustrated, a brush seal generally indicated 18 is disposed within an arcuate slot of the packing ring 10 and includes a plurality of bristles 20, tips of which engage along the surface of the rotary component 16. A pressure plate 22 and a fence 24 are machined on the packing ring and lie on respective opposite sides of the bristles. The brush bristles, as is conventional, are typically angled or canted in the direction of rotation of the rotary component 16 and each bristle forms an acute angle with an intersecting radius of the rotor 16. The packing rings 10 are preferably formed in segments to complete an annular brush seal about the rotary component. Set screws, not shown, along the outer diameter of the packing ring may be used to secure the brush seal 18 in the packing ring slot.

Figure 2:
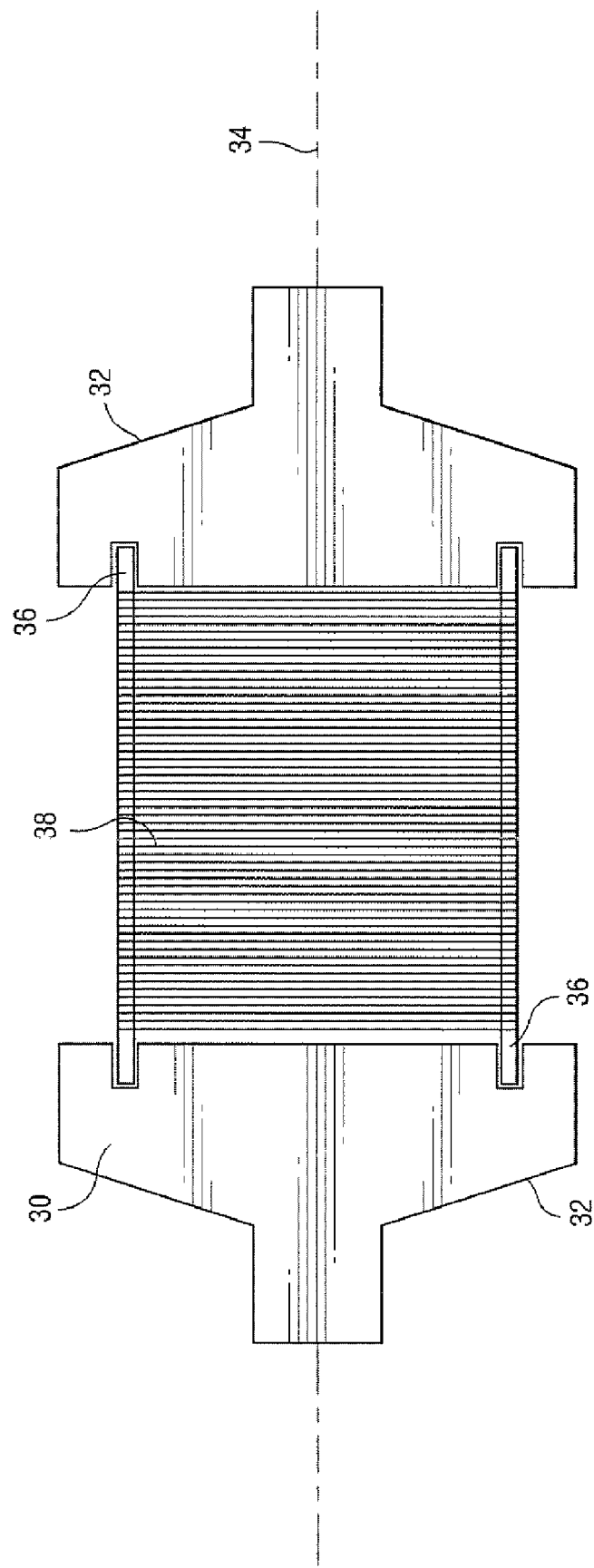
FIG. 2 is a plan view of a fixture for winding wire bristles about a frame.
Figure 7:
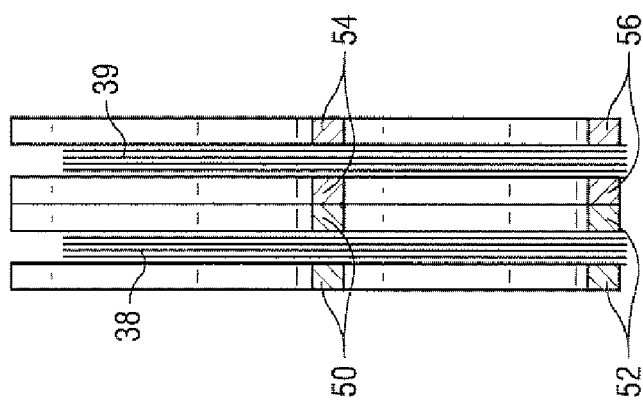
FIGS. 6 and 7 are views similar to FIGS. 4 and 5, respectively, with excess wire on the runs removed.
Figure 6:
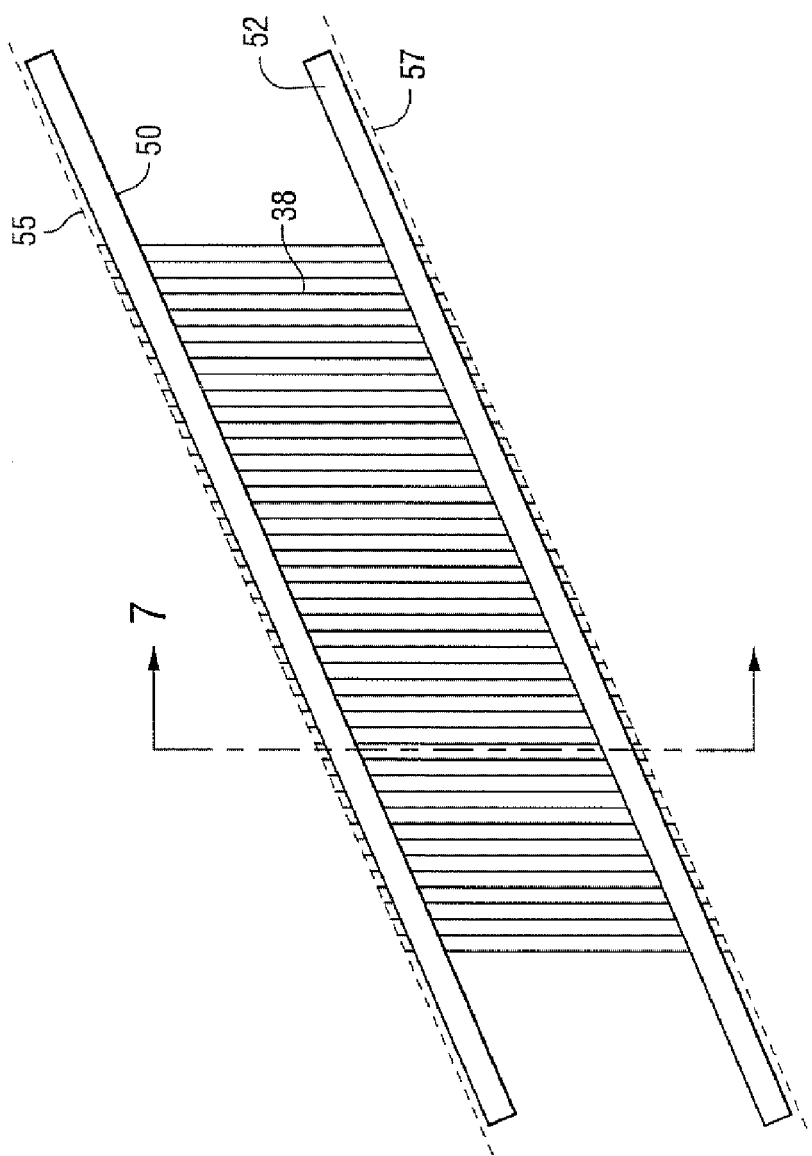

Referring to FIG. 2 there is illustrated a fixture 30 comprised of two end supports 32 mounted for rotation about an axis 34. The end supports 32 hold frames or plates 36 for rotation about axis 34. The frames or plates 36 are spaced from one another and enable a wire to be wrapped around the plates forming a pair of wire runs 38 between and on opposite sides of the plates or frames 36. As illustrated in FIG. 3, preferably the frames or plates 36 comprise pairs of plates on opposite sides of the fixture, although it will be appreciated that only one plate may be used along each side of the fixture 30. A wire 37 for forming first and second runs 38 and 39, respectively, on opposite sides of and between plates 36 is mounted on a spindle 40. The spindle 40 is biased to provide the required tension on the wire 37 as the wire is wrapped about the plates 36. A guide 42 receives the wire 37 from the spindle 40. The spindle and guide are mounted on a tool post holder 41 which enables the spindle, guide and wire for displacement in a longitudinal direction parallel to axis 34 (FIG. 2) as the wire is wrapped about the frames 36. Thus, the fixture 30 is rotated about axis 34. The tool post holder with the spindle, guide and wire is moved back and forth parallel to the axis under mechanical or nc control. The speed of rotation and the movement of the tool post holder is timed to achieve the required spacing between the wire strands forming the runs 38 and 39. The spacing is a function of the final diameter of the seal, the wire diameter and the length of the bristles. Consequently, as the fixture 30 rotates, the wire is applied about the frames 36 in multiple passes to achieve the desired wire spacing, relative position between strands, number of layers and number of strands per inch.

Upon removal of the wire wrap and frames 36 from the fixture 30, the wrap and frames are set in a new fixture, not shown. As illustrated in FIG. 4, first and second pairs of flat plates 50, 52, respectively, are disposed at first and second locations spaced from one another along first wire run 38 with the plates of each pair lying on opposite sides of first run 38 and in generally parallel relation with one another. Similarly, another set of first and second pairs of flat plates 54, 56, respectively, are disposed at first and second locations spaced from one another along second wire run 39 with the plates of each pair thereof lying on opposite sides of second run 39 and in generally parallel relation to one another. The plates 50, 52, 54, 56 are preferably disposed at an angle to the wrapped wire strands. The angle is generally a function of the final seal diameter. The pairs of plates 50 and 52 and the pairs of plates 54 and 56 are disposed in generally parallel relation with one another, respectively. The plates 50, 52, 54 and 56 are clamped in the fixture, not shown and clamp the wire runs between the pairs of plates. The excess wire run material outside of the pairs of plates 50 and 54 along one side of the wire frame and outside the pairs of plates 52 and 56 along the opposite side of the frame are cut and removed as indicated by the dashed lines 55 and 57 in FIG. 4. It will thus be appreciated that the pairs of plates 50, 54 and 52, 56 lie along opposite sides of the wire runs as cut, are angularly related to the plates and extend generally parallel to one another. That is, the pairs of plates 50, 52, 54 and 56 each straddle the cut wire ends.

The plates 50, 52, 54 and 56 inside the wire runs plates described and illustrated in copending patent application Ser. No. 11/237,824, filed Sep. 25, 2005 by William Adis and Bernard Couture, titled "Pressure Balanced Brush Seal," incorporated herein by reference. Also, the inside plate pairs 50, 52 and 54, 56 may each be formed of a single piece generally in the form of a parallelogram with an open center. Dowel reference holes with dowels therethrough may be incorporated.

Upon removal of the waste wire and plates 36, the wire is secured to the plate pairs along the opposite sides of the wire run frame. Preferably, weld material 60 is applied at two locations along each of the cut ends of the remaining wire runs to secure, respectively, an interior plate, e.g., 50, the directly adjacent cut ends of the wire strands and an exterior plate, e.g., 50, to one another. By welding the interior and exterior plates adjacent the cut wire strands at each of four locations along the lengths of the pairs of plates 50, 52, 54 and 56, both ends of the two wire runs are welded between pairs of plates.

A heat treatment is then performed to remove the wire set and anneal the top plates with the weld for bending. The two pairs of welded wire runs are then separated from one another as illustrated in FIG. 9. The wire run between each of the welded opposite sides thereof is also cut as illustrated in FIG. 10 preferably along a mid line to form a pair of bristle packs 70. It will be appreciated that each of the four bristle packs thus formed by winding wire about the initial frames 36 and performing the previously described method steps includes a pair of side plates which straddle the proximal ends of the wires, now bristles. Also, the bristles extend from the side plates at a selected angle relative to the side plates and terminate in free cantilevered distal ends. It will also be appreciated that as illustrated in FIG. 10 the bristle packs extend in a linear direction albeit the bristles extend at an angle relative to the side plates. Thus, the bristle packs can be made in batches to any required bristle angle and interspacing and stocked in linear lengths prior to forming a particular brush seal for a specific application.

Assuming there is a requirement for a brush seal between stationary and rotary components of a particular diameter and at a specific location, an appropriate length of the bristle pack can be cut and bent to the diameter required for the specific brush seal application. For example as illustrated in FIG. 11, a length of the bristle pack is bent to form a 60° segment to a particular diameter by passing the plates through a series of rollers 80 and 82. The rollers 80 and 82 which respectively overlie and underlie opposite edges of the plates may form the plates and bristles to a specific diameter. The tips of the bristles may then be cut to the required diameter typically to enable the bristle tips to engage the rotary component. From the rolling operation, the brush seals are thus in the form of an arcuate brush seal having a generally tee shaped cross sectional configuration. In that configuration, the brush seal is placed into a slot e.g. in a packing ring or a spill strip. Thus, the standard pressure plate and fence on opposite sides of a brush seal, which are typically separate complex structures could instead be machined e.g. using a five axis nc machine and formed into spill strip or packing ring segments. The new tee shaped brush seal is then installed within the machined slot and backed out of the inner diameter of the spill strip or packing ring segment with a spring or with a set screw.

Figure 13:
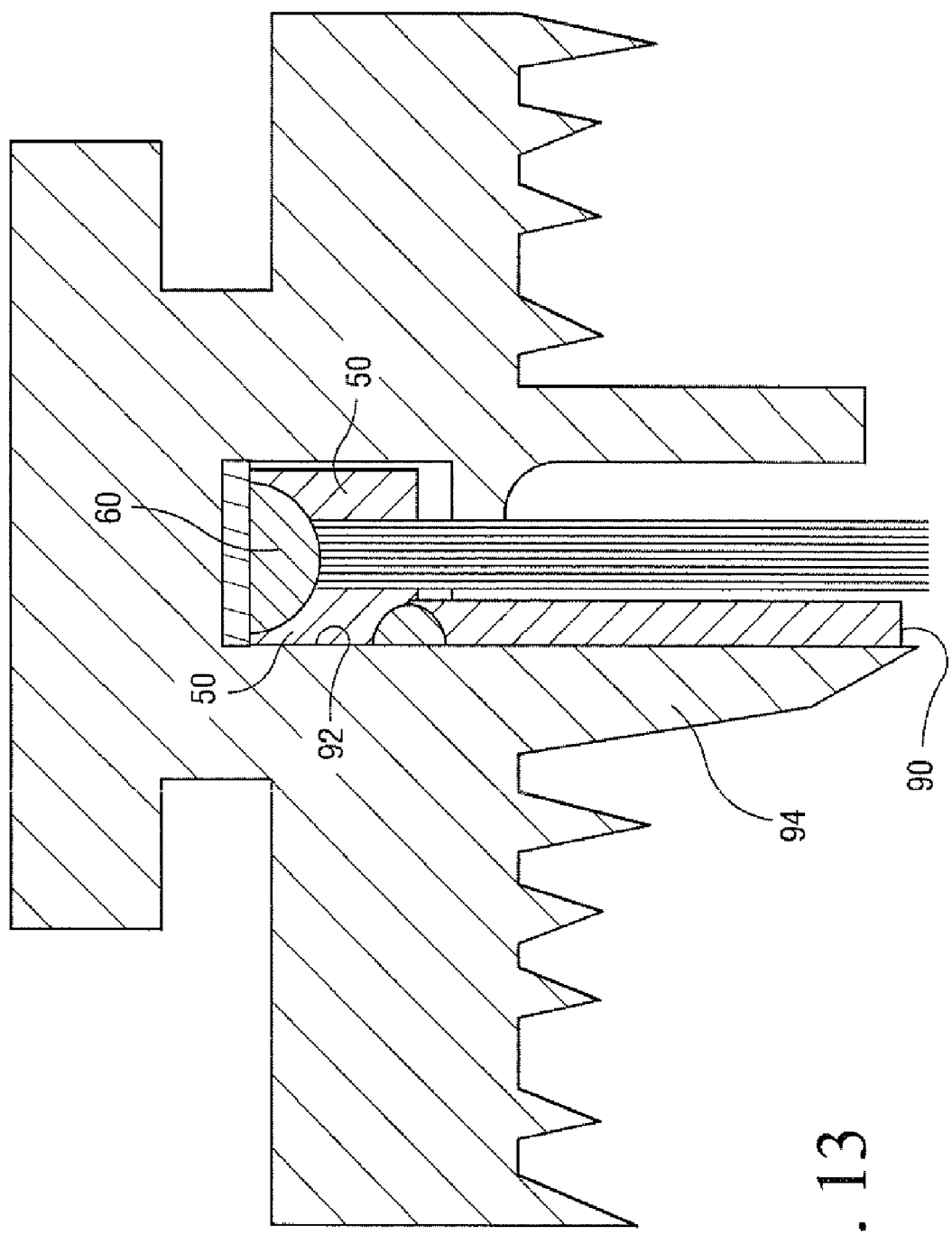
FIG. 13 is a end view of a packing ring with brush seal applied together within anti-hysteresis plate.

Referring to FIG. 13, the tee shaped brush seal as applied for example to a packing ring segment may have a pressure balance plate 90 along the interior slot 92 of the packing ring and bearing against a standard pressure plate 94. The pressure balance plate 90 provides an anti-hysteresis feature and is the subject of co-pending application Ser. No. 11/231,879, filed Sep. 22, 2005 titled Seals for Turbines and Turbo Machinery, the disclosure of which is incorporated herein by reference.

With the foregoing described method of fabricating a brush seal, it will be appreciated that one wire wrap as described above, may produce four bristle packs of any selected length, number of bristles, angle of bristles and length of bristles. The wire may be wrapped about the frames and cut to provide large batches of bristle packs in linear form. When there is a requirement for a seal for sealing about a particular axis and having a particular diameter, the desired linear length of bristle pack may be cut and rolled into the required diameter and subsequently incorporated the desired application, e.g., a spill strip or packing ring segment. The manufacturing cycle is short and the manufacturing costs are substantially reduced as compared with currently practices in the manufacture of brush seals.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of manufacturing a brush seal comprising the steps of:
   (a) maintaining a pair of first elongated frames spaced from one another on a fixture;
   (b) wrapping wire strands about and longitudinally along the pair of frames in multiple longitudinal wire passes forming wire runs;
   (c) disposing two pairs of first elongated plates between the wire runs at respective locations spaced from one another along the wire runs and at an angle to the wrapped strands with the plates of each of the two pairs lying parallel to and in registration with one another;
   (d) clamping two pairs of second elongated plates at second respective locations along an outside of the wire runs with each pair of the second elongated plates registering with each pair of the first elongated plates, the two pairs of second elongated plates extending generally parallel to the pairs of the first elongated plates;
   (e) cutting the wrapped strands outside of and beyond the first and second pairs of elongated plates forming two wire strand runs with both ends of each of the runs disposed between and straddled by said first and second pairs of elongated plates;
   (f) welding the cut strand runs and the pair of plates straddling the both ends of the runs; and
   (g) cutting the wire strand runs intermediate the welded ends of the strand runs to form two bristle packs from each of the runs and from which the bristle packs form the brush seals.

2. The method according to claim 1, wherein the step of wrapping includes rotating the fixture mounting the pair of first elongated plates relative to a guide, feeding wire strands onto the pair of first elongated plates, and reciprocating the guide in opposite longitudinal directions to make the multiple longitudinal passes of the wire along the two pairs of first elongated plates.

3. The method according to claim 1 including rolling one of the bristle packs formed from one of the runs to the preselected diameter forming the brush seal for sealing between stationary and rotary components.

4. The method according to claim 3 including cutting distal ends of the bristle packs of said one of the brush seals such that tips of the cut bristles form a pre-determined diameter to one of a bristle pack center.

5. The method according to claim 1 including cutting each of the wire strand runs in half substantially along a center line of the wire runs between the pair of plates.

* * * * *